US008855413B2

(12) United States Patent
Tang

(10) Patent No.: US 8,855,413 B2
(45) Date of Patent: Oct. 7, 2014

(54) IMAGE REFLOW AT WORD BOUNDARIES

(75) Inventor: Ding-Yuan Tang, Pleasanton, CA (US)

(73) Assignee: ABBYY Development LLC, Moscow (RU)

( * ) Notice: Subject to any disclaimer, the term of this patent is extended or adjusted under 35 U.S.C. 154(b) by 425 days.

(21) Appl. No.: 13/107,084

(22) Filed: May 13, 2011

(65) Prior Publication Data

US 2012/0288190 A1    Nov. 15, 2012

(51) Int. Cl.
*G06K 9/00*    (2006.01)
*G06K 9/48*    (2006.01)

(52) U.S. Cl.
CPC ... *G06K 9/00* (2013.01); *G06K 9/48* (2013.01)
USPC .......................................... 382/165; 382/177

(58) Field of Classification Search
None
See application file for complete search history.

(56) References Cited

U.S. PATENT DOCUMENTS

| | | | | |
|---|---|---|---|---|
| 6,480,291 | B1 * | 11/2002 | Daniels et al. | 358/1.11 |
| 6,915,484 | B1 * | 7/2005 | Ayers et al. | 715/234 |
| 7,519,221 | B1 * | 4/2009 | Nicholson | 382/181 |
| 2003/0014445 | A1 * | 1/2003 | Formanek et al. | 707/526 |
| 2003/0179201 | A1 * | 9/2003 | Thacker | 345/441 |
| 2004/0004641 | A1 * | 1/2004 | Gargi | 345/848 |
| 2004/0165782 | A1 * | 8/2004 | Misawa | 382/239 |
| 2004/0202352 | A1 * | 10/2004 | Jones et al. | 382/114 |
| 2005/0108640 | A1 * | 5/2005 | Thacker | 715/541 |
| 2005/0188303 | A1 * | 8/2005 | Ayers et al. | 715/517 |
| 2005/0216836 | A1 * | 9/2005 | Duke et al. | 715/531 |
| 2007/0237428 | A1 * | 10/2007 | Goodwin et al. | 382/309 |
| 2008/0170789 | A1 * | 7/2008 | Thacker | 382/186 |
| 2008/0267535 | A1 * | 10/2008 | Goodwin et al. | 382/305 |
| 2011/0173532 | A1 * | 7/2011 | Forman et al. | 715/256 |
| 2011/0289395 | A1 * | 11/2011 | Breuel et al. | 715/205 |
| 2012/0096345 | A1 * | 4/2012 | Ho et al. | 715/252 |
| 2012/0102388 | A1 * | 4/2012 | Fan | 715/234 |
| 2012/0128249 | A1 * | 5/2012 | Panjwani et al. | 382/177 |
| 2013/0109915 | A1 * | 5/2013 | Krupnik et al. | 600/109 |

* cited by examiner

*Primary Examiner* — Sean Motsinger
(74) *Attorney, Agent, or Firm* — LeighAnn Weiland; Veronica Weinstein

(57) ABSTRACT

Described is a method for identifying text or other information in one or more images and reflowing images of individual elements of text at a word boundary or character boundary on devices of different sizes. The text may be rescaled while retaining the look and feel of the original text. The size may be scaled according to one or more parameters. Text may be captured in a plurality of images and merged together to form a single document or document-like collection. Text may be fully recognized, indexed, sorted and/or be made searchable. Text may be wrapped around objects and features identified as non-text or non-informational elements in an image. Borders or edges between successive elements of text may be smoothed, combined, overlapped and/or blended. Backgrounds of text may be adjusted to make the appearance of successive elements aesthetically pleasing or as close to the original as possible. Fonts may be automatically generated for display of the text on any device in its original form—with breaks in the text at a word or other natural language boundary not found in the original representation of the text.

19 Claims, 11 Drawing Sheets

IMAGE REFLOW AT WORD BOUNDARIES

FIELD

The present invention relates generally to systems, devices and methods for displaying documents and images on screens and in windows of various sizes, and particularly to displaying image-based text on a screen, application window or frame of an arbitrary size.

BACKGROUND

Currently, consumers, business professionals and other individuals (hereinafter, "viewers") often have more than one device (screen) on which or with which they view and consume information. FIG. 1 shows a typical variety of screens 100 that are currently available to viewers. With reference to FIG. 1, the range of size of the screens 100 is substantial. On the smaller end, there is a smart phone 102, and on the larger end there is a monitor 110 such as a computer monitor and a television 112. Of course there are other screens not shown in FIG. 1 that are also available to viewers such as music playing devices. Content or information may also be shown by a projector including a personal projection device.

Viewers consume information on a variety of screens 100 and surfaces and in a variety of sizes of software application frame or window 120. Within a typical day, viewers typically use more than one of the screens 100 such as a smart phone 102, a touch screen 104 (such as on a printer, scanner and copy machine), a tablet computer 106, a notebook computer 108, a monitor 110 and a television 112. Further, viewers use more than one of these devices or screens 100 to access the same or same type of information. Currently, information is often in a network-accessible location such as in a "cloud" location—typically, a computer or service that is contractually operated and made available to a viewer. Such service may be free or may be provided in exchange for money.

Various devices and screens 100 typically handle the task of displaying text available, stored or encoded in a digital form with some level of grace. An encoded form implies that each character of a batch of information or text is encoded, character by character, in the American Standard Code for Information Interchange (ASCII) or some other encoding scheme. With encoded text, various devices 100 are free to render the text according to the programming of its hardware and/or software.

However, desirable and valuable information often includes text in one or more various forms that are not encoded character by character. Such information is often found in an electronic image. Such information is often treated no differently than any other image or no differently than any other part of an image. Consequently, such information is not in a very portable, useable or manipulatable format. Such information also does not easily scale for use on a device attached to or having a relatively small screen (hereinafter "small device"). On a small device, the text either becomes unreadable as an entire document is resized to fit onto the screen or a viewer is forced to repeatedly scroll a document side to side and up and down while reading each line and page of text at a resolution close to or similar to that of an image including a copy of the original text. Further, such text or information is often not indexed or searchable.

A user confronted with such desirable information has hereto been forced to choose between two schemes for preserving and accessing the information. One option or scheme has been to leave the information in an image-based form, with or without compression. This option includes turning the image into a "document" or using a software program to view the original image. However, even if the words, text and information are recognized, the image or document suffers from the shortcomings described above—including the inability to view the text with some level of practicality.

The other option or scheme has been to transform the information by scanning it and performing some form of optical character recognition (OCR) on it. This second option also has substantial shortcomings. For example, the look and feel of the original text is not fully retained and often the surrounding and/or background are lost—stripped by the OCR process. Further, OCR is not a perfect process and therefore yields an imperfect recognition of characters in the text or text region of an image. Strikethrough, underlining, and italicization are just a few of the formats that cause trouble for OCR processing. While a recognized version of the text may become more usable than a raw image of the original text through this second option, the original text has been transformed, encoded and reformatted into another form that in many cases does not resemble the original text. For example, the text or information is shown according to the preferences, settings and abilities of the hardware and software on a particular device. Thus, neither option is appealing to discriminating viewers.

These and other shortcomings of the current art are overcome by use of the present invention.

SUMMARY

A system, device and/or method identifies text or other information in an image and reflows images of text or other information at a word or natural boundary.

A mechanism resizes text or information by re-scaling each element, word, word fragment or character while retaining the look and feel of the original text or information.

Text or information may be captured in a plurality of images and merged together to form a single document or collection of image-based text.

Text may be fully recognized, indexed, sorted and/or be made searchable. Such text may be used along with image-based text.

Image-based text or information may be wrapped around objects and features identified as non-text or non-informational elements in an image.

Borders between successive elements of image-based text or information may be smoothed and blended. Backgrounds of successive elements of image-based text or information may be blended or adjusted to make the appearance of successive elements aesthetically pleasing or transition as smoothly as possible or as smoothly as in the original. Alternatively, the background of the text is treated as a separate layer with text words or elements floating or repositioned over the top of some or all of the original background. Some or all of the background or non-text elements or features may be scaled, duplicated and/or removed as needed or desired by a user.

Optionally, identification and analysis of a text in one or more images yields one or more representations or copies of image-based text. Such representations or copies can be used to display the original text on any one of a plurality of devices while retaining the look and feel of the original text or information—with breaks in the text at a word or other natural boundary not found in the original text. A viewer or user is ideally provided with multiple options or ways for displaying different views of a collection of text. For example, all, some or none of the individual image-based words may be replaced with recognized (OCR'd) words according to a desire of a viewer or ability of a device to render the text from the original image. In another example, a line of original text may be shown above or below an OCR'd version of the same line of text. In yet another example, a panel of original image-based text may be shown on the side of another panel of an OCR'd version of the same text; the panel of original image-based text wrapping at a word boundary discovered during processing.

Optionally, each word, phrase or sentence may be translated from a first or original language into a second language by replacing each character with an original copy of a character from the image-based text or replacing the original text in place with a character from a font type that is similar in size and style where possible.

This Summary introduces a non-exclusive selection of concepts and aspects of the invention in a simplified form that are further described below in the Detailed Description. This Summary is not intended to identify key or essential features of the claimed subject matter, and it is not intended to be used to limit the scope of the claimed subject matter.

BRIEF DESCRIPTION OF THE DRAWINGS

The novel features believed characteristic of the subject matter are set forth in the appended claims. Throughout, like numerals refer to like parts with the first digit of each numeral generally referring to the figure which first illustrates the particular part. The subject matter and a preferred mode of use are best understood by reference to the following Detailed Description of illustrative implementations when read in conjunction with the accompanying drawings.

DETAILED DESCRIPTION

The following describes various examples of implementations of the invention.

Figure 1:
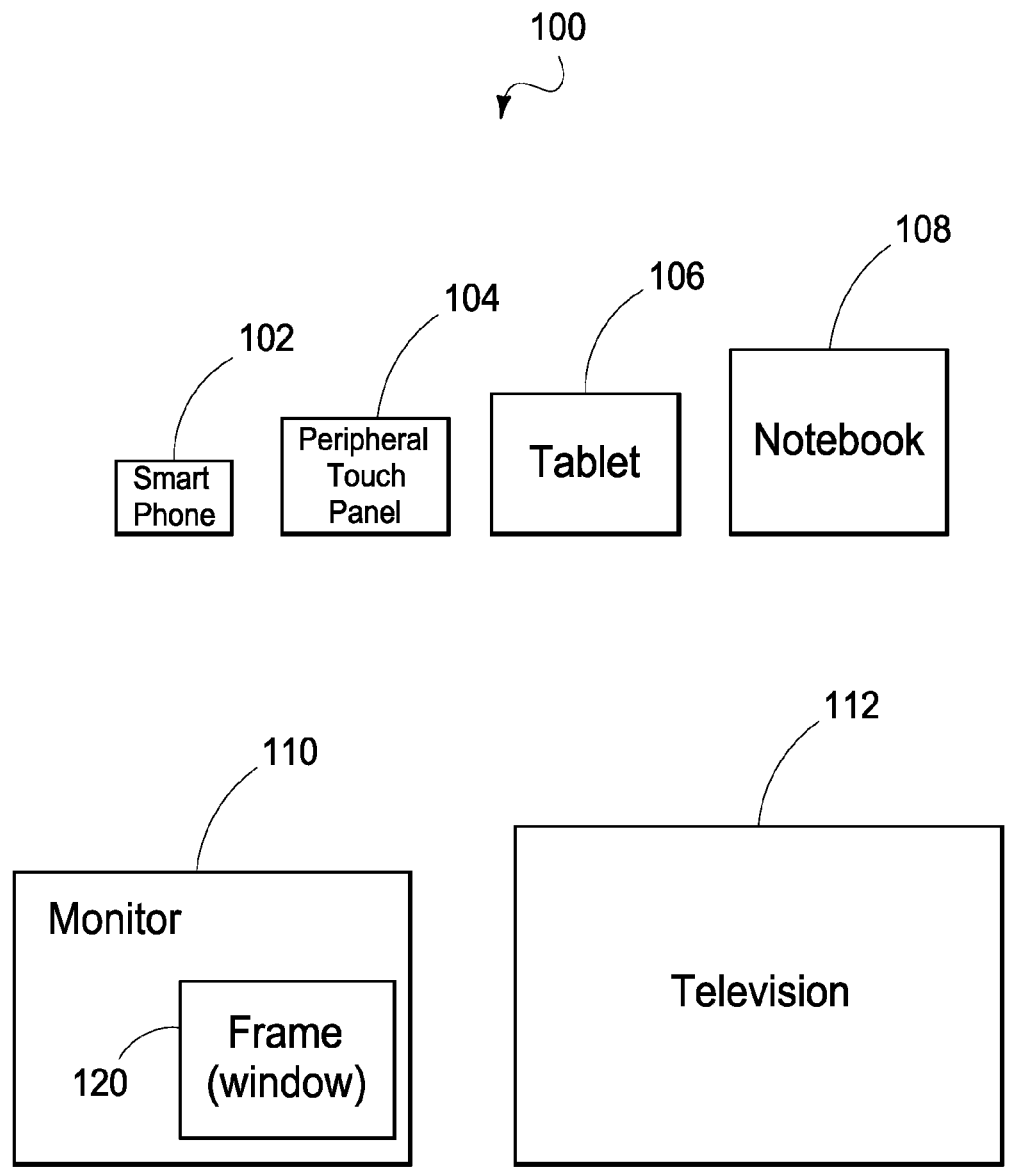
FIG. 1 shows a typical variety of screens or electronic displays that are currently available to consumers and others on which to view information.
Figure 2:
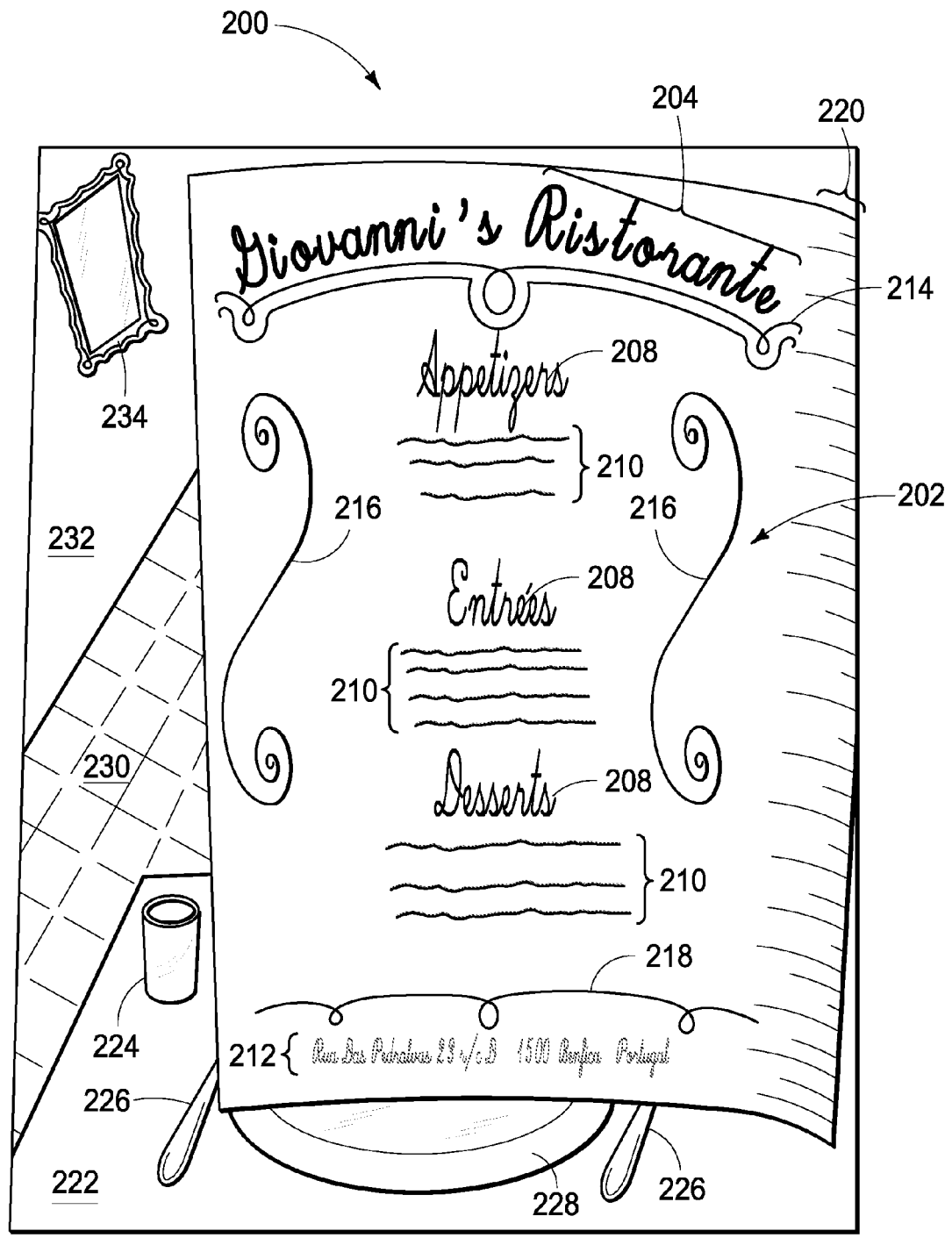
FIG. 2 shows an electronic image, a portion of which comprises text in a stylized format on a document or medium.

FIG. 2 shows an electronic image 200, a portion of which comprises text. The text may be in a stylized format such as on a document or medium. With reference to FIG. 2, an electronic image 200 is of a scene presumably captured by a camera, scanner or other electronic device (not shown). The electronic image 200 comprises a representation of a menu 202, and presumably a portion of the interior, of Giovanni's Ristorante. Perhaps the menu 202 has a sentimental or some other value or interest to the electronic image owner, an interest in the look and feel of the particular menu 202 and/or information on the menu 202. Interest in the menu is presumably more than just interest in an abstract transcription of the text or information from or in the menu 202. It is presumed for sake of description herein that interest is in the text of one or more electronic images.

The menu 202 shows a variety of elements including a title text 204 in a stylized or artistic font, multiple heading texts 208 (e.g., Appetizers, Entrees, Desserts) announcing various types of foods offered for sale, individual menu items 210, and a footer text 212. Each of the texts 204, 208, 210 and 212 is in a stylized or artistic font and is shown at a particular size. Alternatively, one or more of the texts 204, 208, 210 and 212 may be hand drawn, handwriting, painted or formed in one of any number of ways. Further, the menu 202 includes a variety of non-textual elements or features such as a stylized flourish or design element 214 beneath the heading text 204, side elements 216, and a footer design element 218. The electronic image 200 or menu 202 may include a shadow 220 or other artifact or feature that is not necessarily intended to be a part of the representation of the menu 202 but which is incident to the menu 202. Generally, and as shown in FIG. 2, an electronic image 200 may contain one or more non-textual elements or features that are not part of, incident to, or associated with the document or medium of the text. In FIG. 2, such non-textual elements or features include, for example, a table 222, a glass 224, silverware 226, a plate 228, floor 230, wall 232 and a picture 234. Such non-textual elements or features may be treated separately from non-textual elements or features of the medium immediately surrounding or adjacent to textual or informational elements. For example, one or more non-textual elements may be cropped and discarded when the electronic image 200 is processed.

In a preferred implementation, the original electronic image 200 is processed to isolate the menu 202 and any other recognizable text-containing or text-based element in the electronic image 200. Either automatically or by user selection, or combination of automation and user indication or selection, the menu 202 is isolated for viewing, saving and further processing. The following figures illustrate how the menu 202 may be processed and re-displayed for viewing.

Figure 3:
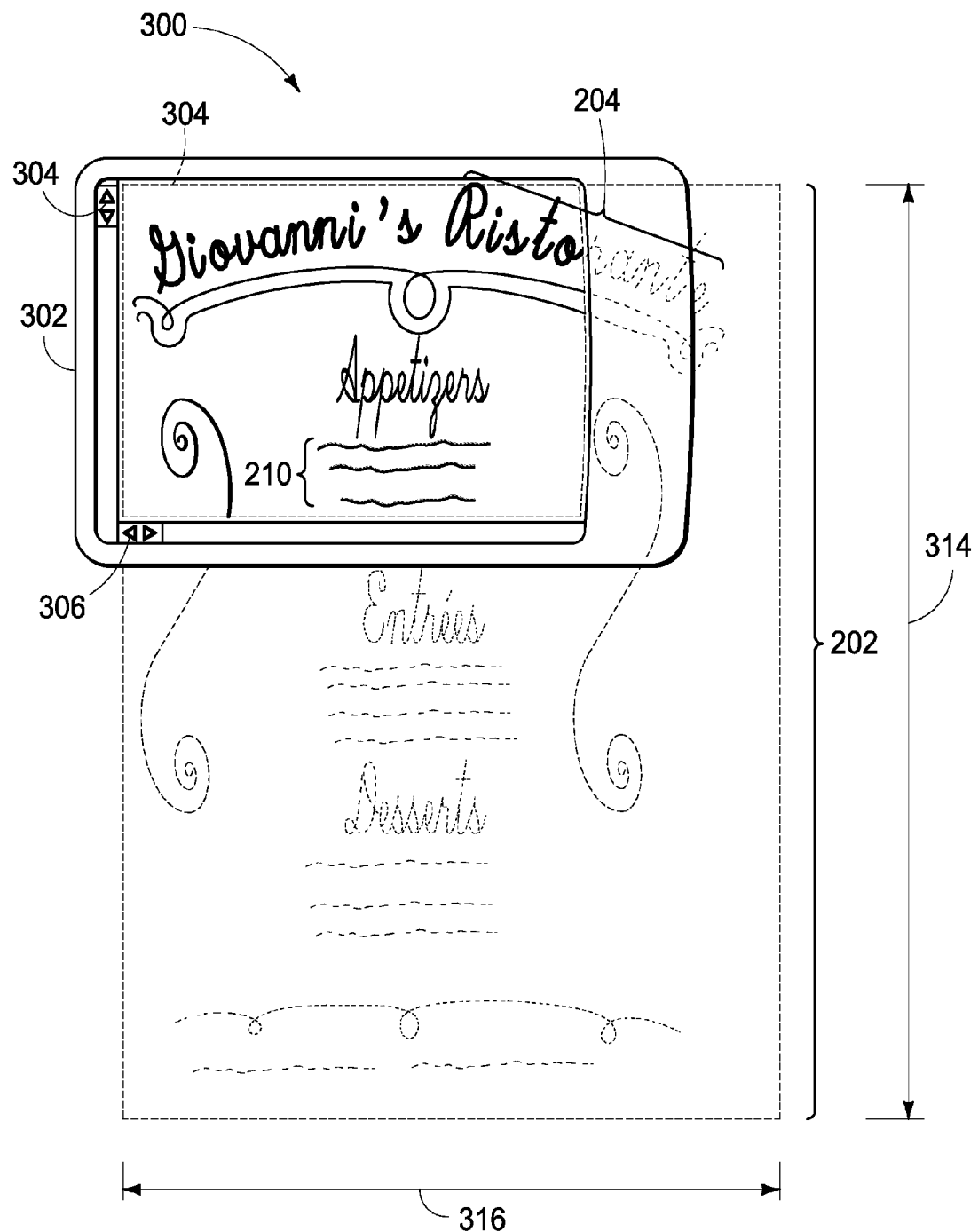
FIG. 3 shows a smart phone displaying a portion of the electronic image shown in FIG. 2, a portion comprising some of the text in the stylized format.

FIG. 3 shows an option 300 for viewing text on a smart phone 302. With reference to FIG. 3, the smart phone displays a portion 304 of the electronic image 200 shown in FIG. 2, an upper left portion 304 comprising some of the text in the stylized, image-based format. The smart phone 302 shows the stylized text and menu 202 at or near the same resolution as recorded or available in the electronic image 200 such as on a pixel by pixel basis or some other basis. When the smart phone 302 treats the menu 202 as a single image, the smart phone 302 is only capable of displaying, for example, an upper left portion 304 of the menu 202 at a resolution that is reasonably close to that of the original menu 202 or a resolution sufficient to read the text of the menu 202. In such a scenario, the smart phone 302 does not substantially resize some or all of the original image 200 or menu 202. When it does so, every part of the electronic image 200 is equally resized or receives equal treatment. The displayed portion 304 comprises text 204, 208 and 210 in its stylized format as found in the original electronic image 200 and menu 202 or medium.

FIG. 3 shows some of the limitations of displaying text in electronic images of relatively large size (such as the one shown in FIG. 2) on a small device or in a window or frame displayed on any device. To be able to read all of the various texts found in the menu 202, the small device or display does not have a sufficient number of pixels to show an entire length 314, width 316 or length 314 and width 316 of the menu 202. Thus, the upper left portion 304 does not show a sufficient portion of the menu to enable a viewer to see portions of individual menu items 210 or to see all of the available individual menu items 210 without scrolling, panning or adjusting the representation of the menu 202. While the upper left portion 304 of the menu 202 is accurately shown, and the stylized text of the menu 202 is accurately shown, a user of the smart phone 302 would be required, for example, to use a vertical scroll user interface mechanism (UIM) 304 and/or a horizontal UIM 306 to see other than the upper left portion 304 of the menu 202. The smart phone user is prevented from seeing an accurate representation of one or more entire lines of menu item text 210 from the menu 202. FIG. 3 shows one way or mechanism of how a small device (e.g., smart phone, touch screen, laptop) can treat image-based representations of text (and images generally) without the use of compression, transformation, resizing or other mechanism.

Figure 4:
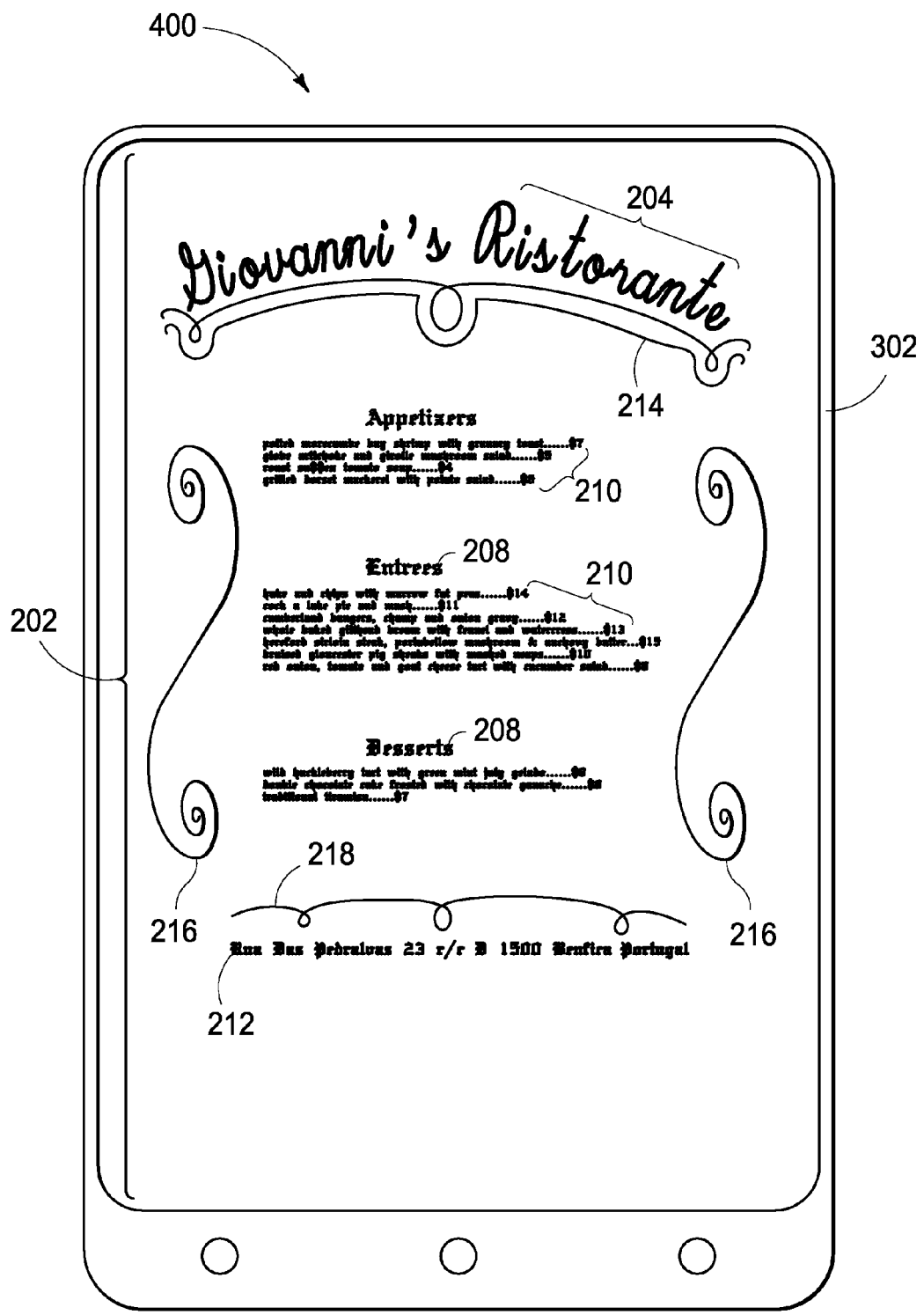
FIG. 4 shows a smart phone displaying a portion of the electronic image shown in FIG. 2, a portion comprising the text in the stylized format at an unreadable or unusable resolution.

FIG. 4 shows another way or mechanism of how a small device or smart phone 302 can treat image-based representations of text (and images generally). With reference to FIG. 4, such smart phone 302 can use compression or other image manipulation mechanism to reduce the size of the image 200 and menu 202—until some, most, or the entire menu 202 fits on the smart phone 302. Some text and non-informational elements should be treated in this way, but in this implementation, the smart phone 302 does not discriminate between text elements and non-text elements. While each of the lines of text and elements of text 204, 208, 210 and 212 is shown on the smart phone 302 or small device, the text is or is likely too small to be readable, accurately perceived or of use to a viewer. While this mechanism of handling images on small devices may be somewhat effective in regard to non-textual elements (e.g., stylized design 214 beneath the heading text 204, side elements 216, footer design element 218), this mechanism may not be effective or an acceptable mechanism to handle image-based representations of text and stylized text such as from the original electronic image 200.

Figure 5:
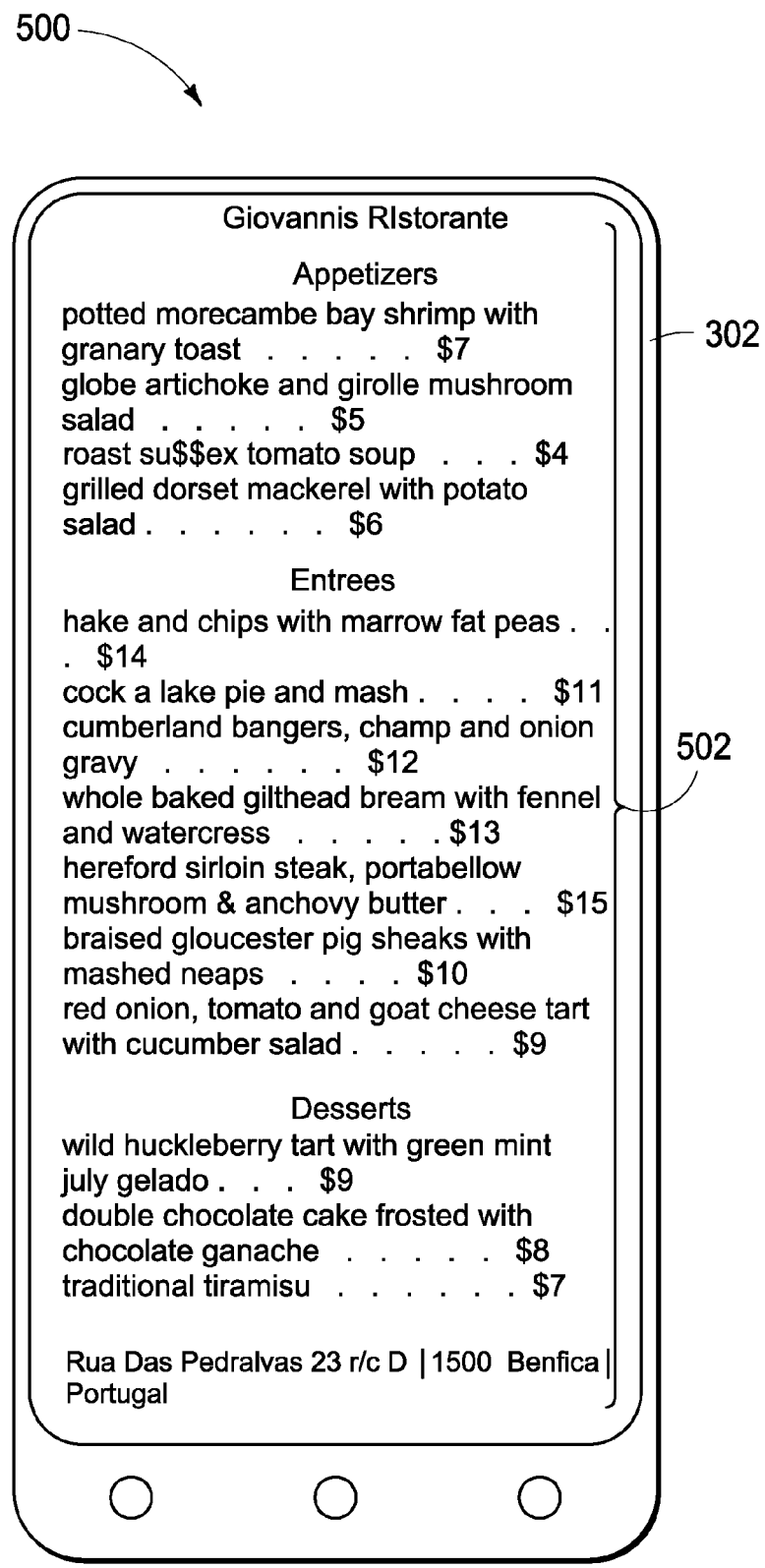
FIG. 5 shows a smart phone displaying a portion of text that has been recognized from the electronic image shown in FIG. 2 and is shown in a font generated by the smart phone.

FIG. 5 shows yet another way or mechanism of how a small device or smart phone 302 can treat text in, derived from, or associated with, an electronic image 200. With reference to FIG. 5, a smart phone 302 (or a pre-processor or pre-processing service) may use optical character recognition (OCR) to identify, recognize, and transform the text that is originally in a stylized format into an encoded format. Alternatively, a smart phone 302 could communicate with another device, service or means, such as use of a human to read and perform data entry, to transform, translate or transcribe image-based or stylized text into an encoded format. FIG. 5 shows a smart phone displaying a portion of transformed text 502 that has been identified, recognized, and transformed or transcribed from the electronic image 200 and menu 202 shown in FIG. 2. With reference to FIG. 5, transformed text 502 is displayed in a format, size and/or font generated by the smart phone 302. As can be seen by comparing FIG. 2 with FIG. 5, the stylized formatting of the text in the menu 202 has been lost and replaced with formatting generated by the smart phone 302. Such formatting may be a default format, size and/or font of the smart phone 302, or may be default or selected format, size and/or font of an application (not shown) and operating on the smart phone 302 and used to display the encoded text 502 on the smart phone 302. Whatever the source of the new format, size and/or font, the appearance (aesthetic and otherwise) of the original text 204, 208, 210 and 212 from the menu 202 is lost. Encoding and transforming text into a device-generated font is not a universally acceptable mechanism to handle image-based stylized text on a small device, but is one method of treating image-based stylized text.

Image Reflow

Figure 6:
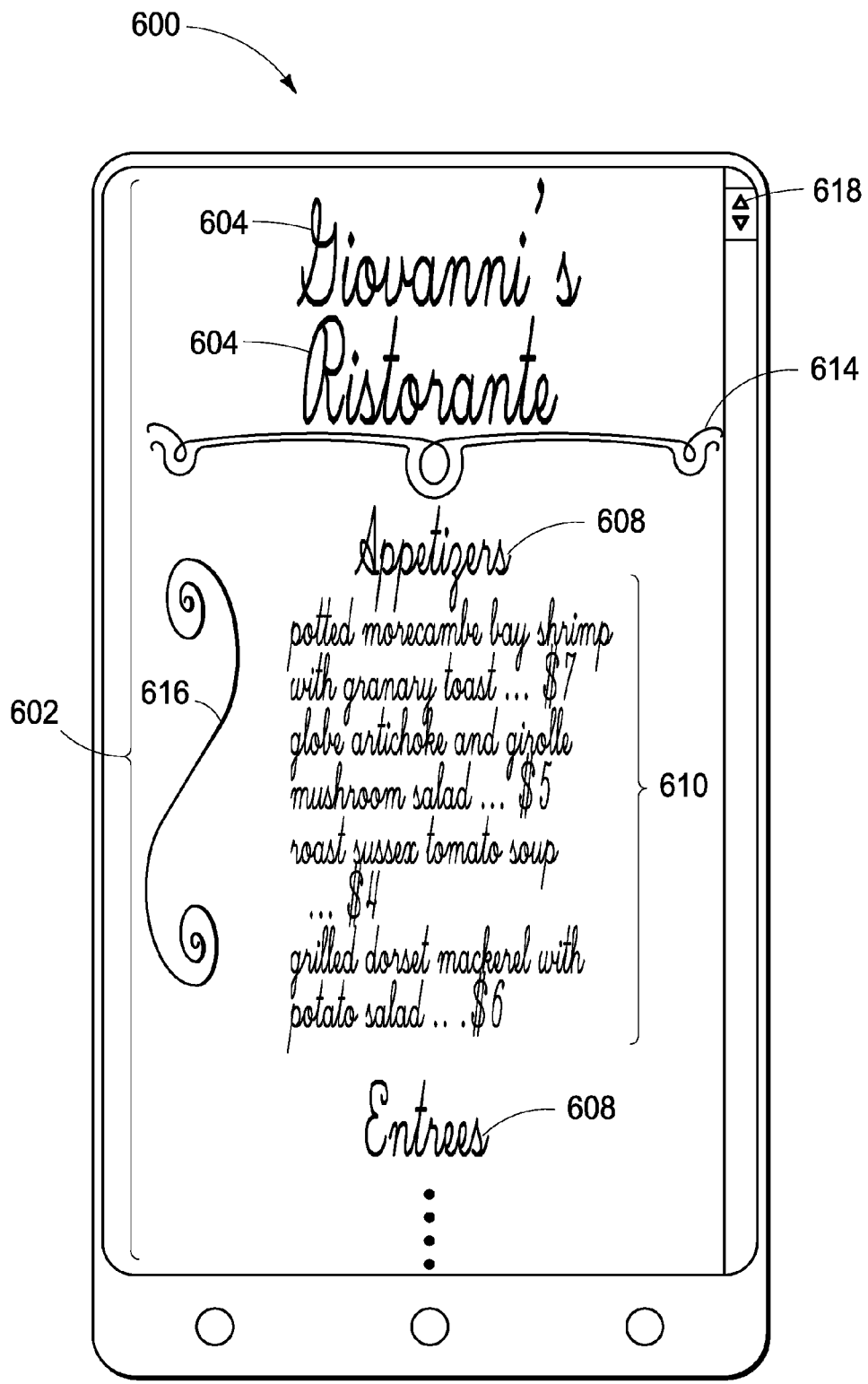
FIG. 6 shows elements and text from the electronic image in a state where the appearance of the text has been substantially preserved and shown at a desired resolution with breaks at the boundaries of words.

FIG. 6 shows a smart phone 600 displaying image-based stylized text and other elements from the electronic image 200 and menu 202. FIG. 6 shows one implementation of yet another way that a smart phone 600 can render and work with image-based stylized text. With reference to FIG. 6 (in view of FIG. 2), the menu 602 has been intelligently transformed. Words have been rearranged to conform to the particular display of the smart phone 600. Actual representations of words have been lifted from the original electronic image 200 and placed onto the smart phone 600. Some or all of the background or background elements have been incorporated, added to, made part of, or layered under the words from the original electronic image 200. For example, the background or non-textual elements include a representation or copy of a design element 614 and a side element 616.

According to a preferred implementation, each title word 604 of the title text 204 has been identified as text (a region including or likely to include text). A similar process has happened for heading words 608 and menu item words 610. Word boundaries (divisions between words) have been identified. Optionally, word edges have also been identified or defined. For purposes of illustration, a word may include some of the surrounding pixels near the respective text in the image 200. Alternately, a image-based word may include some surrounding background—non-text elements and background elements or color(s)—as the word is repositioned to conform to the smart phone 600. There may be one or more word edges for a top portion, a bottom portion, a left portion and a right portion in and around each identified word.

Given the size of the display of the smart phone 600, "Giovanni's Ristorante" is shown and has been transformed to place "Giovanni's" above "Ristorante." Given the size of the display, the method may include rotation or one or more other manipulations of each title word 604 (or other text element) that aesthetically makes sense for the particular display. Each of these manipulations is device or screen (or frame or window) dependent or device or screen (or frame or window) specific. Examples of word manipulation may include, but are not limited to, rotation of a word, rotation of each character or element of or associated with a particular word, resizing of the word, resizing of a character within or associated with a particular word, edge smoothing, color correction, and contrast correction within a word or from word to word. Word manipulations may be any of those currently available for performing one or more functions related to or associated with optical character recognition.

With reference to FIG. 6, "Giovanni's" has been rotated clockwise and "Ristorante" has been rotated counterclockwise at least so as to preserve or conserve smart phone screen real estate. Such rotation may also be made to improve readability of the original stylized text. If a size of a title word 604 would have made it impossible to show the title word 604 on a single line, one implementation of the invention would have reduced the size of an entire title word 604 or reduced the size of one or more letters of the title word 604 until the title word 604 fits onto the screen or display of the smart phone 600, or until the new size of the title word 604 reached an allowed feature altering limit. In an exemplary implementation, such allowed feature altering limit is a modifiable limit and is settable by a user. Such allowed feature altering limit is a modifiable limit and is specific to a device, to an image (e.g.

electronic image 200), or to a representation of a portion of an image. Such allowed feature altering limit may be stored in an image, a representation of a portion of an image or in some other place such as in a device, in an electronic file or repository, or in a network accessible location. Such allowed feature altering limit may be set based upon an analysis of the text in the image or representation of the text in the image. One or more such feature altering limits may be made available such as separate limits for each of such manipulations indicated above. Some limits may be combined into groups of limits. In another implementation, a value is provided for each limit and is set to a reasonable value. In yet another implementation, no resizing of one or more letters is allowed.

Resizing may also be done to have one or more of the title text 604, heading text 608 and menu item text 610 be of appropriate or sufficient size to be readable on the particular device (e.g., smart phone 600) or in a window or frame displayed on the particular device. In one implementation, such resizing is done based on one or more pixel counts for one or more representative characters in one or more words. For example, if a typical readable size for a lower case letter on the smart phone 600 is 24 vertical pixels, then a representation of the menu item text 610 is scaled so that some or many of the lower case letters of the menu item text 610 is about or at least 24 vertical pixels. Such resizing may be done irrespective of a typical number of pixels actually found in the original electronic image 200, and is only discovered by analyzing or processing the original electronic image 200 and discovering the representative sizes of text in the text-containing regions. Resizing may be done on another basis such as desired or target character (horizontal) width, number of total pixels for a typical character, etc. for the particular device, window or frame that is displaying the transformed or reflowed text. The scaling or resizing may be done independently for each size or recognized category of text (e.g., title text 604, heading text 608, menu item text 610).

In an alternative embodiment, each character, punctuation number or other divisible element of each word (e.g., title word, heading word) is identified. Such alternative would depend on one or more resources available or conditions present, such as amount of time to render the menu 602, CPU speed, bus speed, memory speed, display speed, display type (eInk, LCD), or page turning, switching between applications. Each of these elements is grouped into a title word 604. When a heading requires reflowing onto a display of different size, each of these elements may be manipulated individually because they have been identified.

With reference again to FIG. 6, a design element 614 associated with the title text 604 has been resized or reduced until it fit onto the smart phone 600. Non-text or non-informational elements such as the design element 614 may be manipulated in any manner, or may be eliminated, depending upon the size or other property of the design element 614, the size or other property of the smart phone 600 or combination of factors including desire of a viewer or user (such as through a software setting). In a preferred implementation, design elements are resized relative or in proportion to one or more identified text elements or relative or in proportion to the size of the smart phone 600 relative to an actual, detected, perceived or measured size or pixel count of one or more text features in an electronic image the menu 202.

In a preferred implementation, design elements are placed in a corresponding place relative to one or more identified text elements. For example, in FIG. 6, the title design element 614 is placed after the last word of the title word 604 ("Ristorante") and before the first heading text 608 ("Appetizers"). The design element 614 retains its same or similar appearance as in the original menu 202, but is reduced in sized so as to spread across the width of the title word "Ristorante" instead of across the entire "Giovanni's Ristorante." The design element has been resized to accommodate the smart phone 600 and yet basically performs its same purpose(s) including separating a title from the remainder of the menu 202 and providing its particular artistic and aesthetic qualities. Similarly, a side design element 616 is resized and placed in relatively a same position on the menu 602 as on the menu 202 shown in the image 200. The design elements may remain stationary relative to the new menu 602 or may float and allow text or a text layer to flow or adjust around, next to or on top of a side design element 616. For example, a title design element 614 may scroll off the top of the menu 602 when a user scrolls or moves to a different portion of the new menu 602, while the side design element 616 may remain on the display of the smart phone 600 when a user scrolls or moves downward toward a lower portion of the new menu 602. The design elements 614, 616 may be a part of a same layer as that of the stylized text or may be a part of a different or additional layer as that of the stylized text.

With reference to FIG. 6, the text of individual menu items 610 has also been intelligently rearranged. Each word of individual menu items 610 is placed on the smart phone 600 in the same order relative to one another. In a preferred implementation, line breaks (ones that were not previously found in the electronic image 200 and menu 202) for each menu item 610 are made at word boundaries. The first menu item 610, on a single line in the original menu 202, "potted morecambe bay shrimp with granary toast . . . $7" has been broken into "potted morecambe bay shrimp" on a first line and "with granary toast . . . $7" on a second line. The other menu items 610 are similarly treated with line breaks at a word boundary. In any event, the format and spacing of each word is maintained. The background of each word is the same or similar to that of each word as it appeared in the original menu 202 or in the image 200. Alternatively, some or all of the background, background elements, noise and imperfections are removed from each word of the menu items 610 (everything is removed except for information related to the stylized text). In another example, an aspect of a background of a first element of the stylized information is adjusted relative to an aspect of the background of a second element of the stylized information. The aspect of the background of the first element is selected from color, hue, brightness, shading, intensity, and contrast. In another embodiment, the aspect of the background of each element of the stylized information on a first line is adjusted relative to an aspect of the background of at least one other element of stylized information on the first line.

Line breaking and rearranging may be done on demand such as at an instant that a view is changed, such as scrolling down the representation of the menu 602 using a scrolling control or scrolling UIM 618. Alternatively, line breaking and rearranging may be done once each time a document or image is opened and displayed on a particular device. Or, line breaking and rearranging may be done after each input or selection by a user (e.g., user selects a magnified view or altered view).

In an exemplary implementation, each word of the menu items 610 are the same or similar size as found in the electronic image 200 when presented on the smart phone 600 for a first time. A same or similar size may be determined on one or more bases such as on the basis of a pixel count in one or more directions for one or more letters of a representative text from the electronic image 200. In another example, a same or similar size may be determined according to a total pixel count for a representative character of a representative text in the original image 200.

In another implementation, the size of the text of the menu items 610 is variable and yet is preserved relative to a standard. For example, one standard is the size of a title text 604, such as originally found in the electronic image 200. Another standard may be the size of a heading text 608 or an intermediate size text. Another standard may be a readable reference text or font such as a text size of a 12-point Times New Roman font configured for a given device such as for the smart phone 600 or for a large LCD TV (not shown). A certain pixel count, dimension, actual size, and so forth for these two devices may be different, but could be a same reference for initially displaying a representation of stylized text on these devices from the electronic image 200. Such readable text size is configurable for, set by or appropriate for the smart phone 600 or other particular device depending on the particular application that may be rendering a representation of the stylized text of the image 200. A standard may be set by a user, determined for a smart phone 600 (or other device as appropriate), determined from an image 200, or may be some other reference.

In a further exemplary implementation, if a user chooses to resize the menu items 610 shown on the smart phone 600, the remaining items in the new menu 602 are proportionately resized. Concurrently, as needed, line breaks are reformed at word or other natural language boundaries such as at a phrase boundary, a noun-verb boundary, et cetera. One implementation of a control for changing (e.g. zooming, enlarging, reducing) the size of displayed stylized text, such as menu items 610, may take the form of a slider control, multi-select control (with typical font size options—e.g., 10 pt, 12 pt, 16 pt) or may be a hidden, natural or intuitive control such as through a multi-touch gesture applied to the display or screen of the smart phone 600. For example, a pinching movement with two or more fingers on a screen may reduce the size of each word of stylized text.

Providing a resize control allows a user to display text at a desired resolution or text size. Such is advantageous in a situation where the viewer or user does not have control of the resolution at which text is captured. Such lack of control of an original image may be from a variety of sources. For example, a user may not know of an optimal distance at which to capture an image with a digital camera. In another example, the original size of text on a document fed through a scanner may be larger than would be optimally viewed on a device. In yet another example, a scanner setting may be set too high and may capture text with more pixels per character than would be prudent to show on a particular device at an original resolution. Thus, by resizing, a user or viewer may be able to view the original stylized text at a desired size on a new medium such as on a smart phone.

Again with reference to FIG. 6, in an alternative implementation, each character of each word of each menu item 610 is also identified and recognized. In this alternative implementation, line breaks may be made between characters while still retaining the look and feel of the original text or information. In a preferred implementation of breaking at a character boundary, a hyphen is placed according to natural language or standard or agreed upon rules. A software control may be granted to a user or viewer to change between these two versions of image reflow—breaking at a word boundary or breaking at a character boundary with the use of a hyphen or other character to mark a break within a word. A user or viewer then may be able to select which version of text reflow to display on any given device, in an application, or in a window or frame.

Thus, with reference to FIG. 6, through image reflow, the state or appearance of the stylized text 610 has been substantially preserved and shown at a desired resolution with breaks at the boundaries of words as if the menu 602 (or other work) were printed or created for the smart phone 600. When a user reads a book using this invention, the text, information and other elements appear identical or very similar to how it appeared in its original form. Image reflow may also be referred to as reflow of natural or native text.

Figure 7:
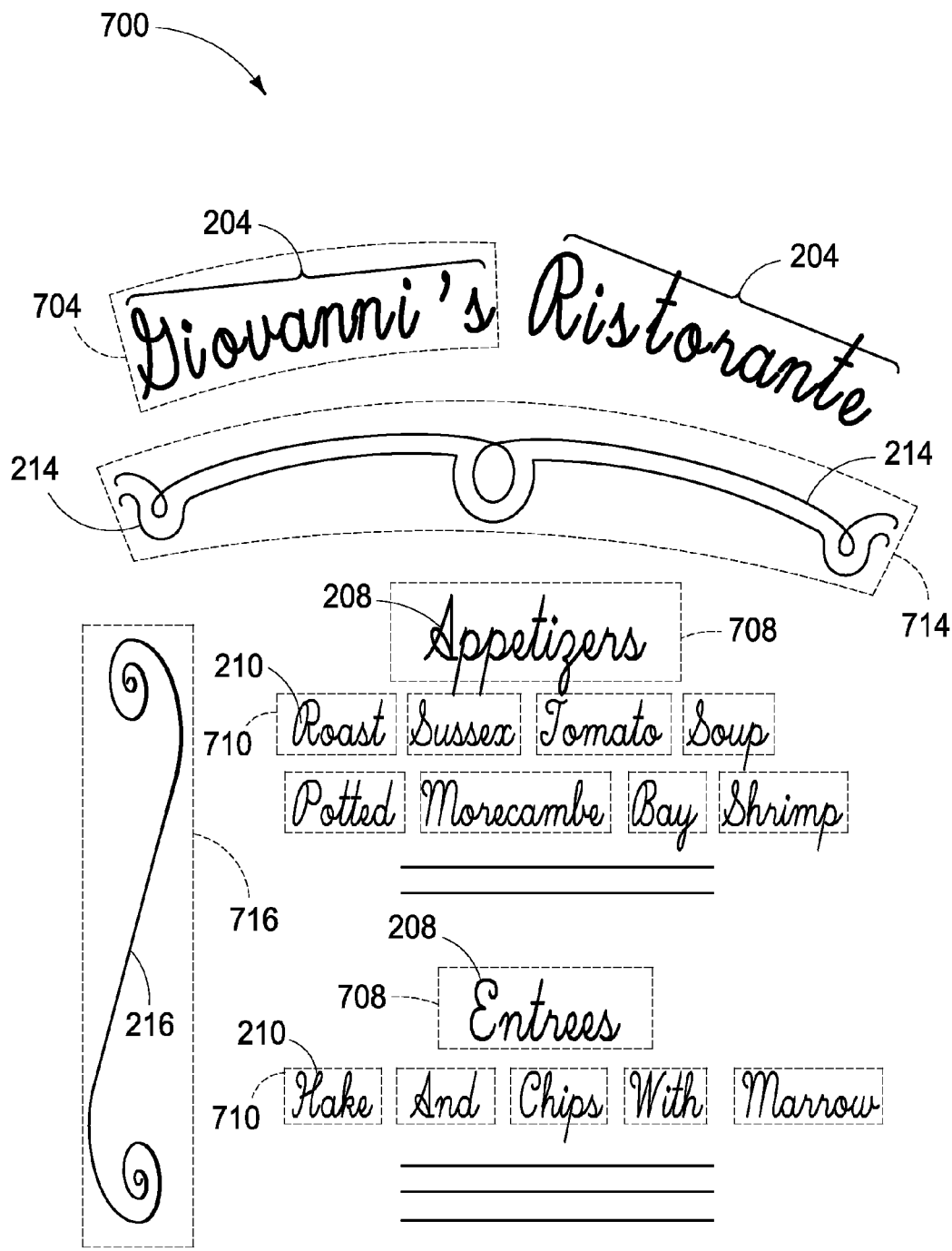
FIG. 7 shows a portion of the electronic image shown in FIG. 2 and shows an exemplary identification of elements within the electronic image.

In yet another exemplary implementation, a user or viewer is given an option to display an OCR'd version of the text along side of, below, above, or instead of an image reflow version. The OCR'd version may be shown one line at a time either above or below a line of stylized text. Alternatively, the OCR'd version may be shown in a panel, frame or window simultaneously with or instead of a panel, frame or window showing a representation of the stylized, reflowed text. Thus, a user or viewer may be able to toggle or switch between a plurality of views of text from an electronic image. For example, a user would be able to review an actual version of a representation of a contract or other legal document. Such user would be able to review and enlarge actual images (image pieces) or representations of images of the words from one or more images of a contract. Thus, from a scanned copy of the contract, a user could verify that an OCR version of the contract or other legal document is 100% accurate. Further, a user could display a portion of the contract or other legal document in a courtroom to members of jury and could enlarge the text as needed with confidence that the text is a copy of the exact text without any concomitant problem of moving a document back and forth under an overhead projector or back and forth with a scroll bar. With the press of a single control, a presenter could switch back and forth between a clean OCR'd version of an original document and a reflowed version showing an actual representation of stylized text in or from an image of the original document. Alternatively, an OCR'd version and a reflowed version could be displayed simultaneously side by side such as in adjacent panels or frames. Further, with the press of a single control, all background elements may be removed leaving a representation of the original text; background elements being, for example, any element or feature from the electronic image that is unrelated to the text as found in the electronic image. Identification FIG. 7 shows a portion of the electronic image 200 shown in FIG. 2 and shows an exemplary identification of elements within the electronic image 200. With reference to FIG. 7, a title text 204 has been identified as indicated by a title text area 704. The title text area 704 includes a margin or area of the medium around the title text 204. The margin may or may not be uniform on all sides of the title text 204. A heading text area 708 also has been identified for each heading text 208. Each word of menu items 210 also has been identified as indicated by a word boundary 710. Identification of areas and boundaries may be done completely programmatically by a method, system or machine. A title text area 704 may be treated the same or similarly as to a heading text 208 or menu item 210 or menu item text. Further, text and text areas may be treated the same or differently from non-text areas. If treated differently, according to one implementation, text and related image fragments (areas) such as text areas and text boundaries may be conceptually or actually treated as one or more separate layers. For example, a text layer may be created for each size or distinct text species that may exist in an electronic image. In such an implementation, one or more text layers may be overlaid on a layer that contains or represents the non-text elements, background or noise found in the original electronic image.

With reference to FIG. 7, an amount of margin around each element of text may be configurable, programmatically determined or may be a fixed amount (either initially or permanently—set at time of recognition). The margin may be around each stroke or component of a character. Alternatively, the margin may be more ovoid, rectangular or regular in shape so as to encapsulate a word. Any technique such as those used in OCR technologies may be used to identify words and word boundaries and word margins.

Similarly, with reference to FIG. 7, a design element area 714 has been identified around a design element 214. The design element area 714, including any design element 214, is treated as a non-text or non-information element or image. In one implementation, such design elements 214 are treated as one or more images or image fragments. These non-text elements may be handled with less deference to fidelity when presented on a device as compared to text or information elements. Similarly, a side design element area 716 has been identified and includes a side design element 216.

In an exemplary implementation of identification, all portions of an area containing text may be treated without any user input. Alternatively, a little or substantial input from a user may be elicited or expected—either to correct or confirm identification of word elements, or to correct or confirm separation of text from non-text, or both correct or confirm identification of word elements and separation of text from non-text. One implementation of such identification and correction would function by analogy to a spell check function in a word processing application where one or more non-text elements or regions are presented to a user for confirmation or adjustment. The same may be offered as an identification function for text elements or text-containing regions. Alternatively, a user may be able to visually identify an error in a reflowed output and can enter a configuration mode through which an instance of error (e.g., grouping of two words as a single word) may be corrected (e.g., inserting a break between the two words that were identified as a single word).

An exemplary scenario of identification and correction is as follows. An image is captured or sent to a device. The image is processed by identifying one or more regions that likely contain text. Then design elements and text elements are identified in the regions likely to contain text. Word boundaries are determined for each text element (e.g. word, character). Then, a relevant portion of the image is presented for viewing on a particular device. At that point, a viewer or user may (through software or other means) use the result, or select an option presented to the user (such as through a user interface element) to accept the identification, or the viewer may be automatically presented with an interface to review the identification. If a user would like to review the identification, in an exemplary implementation, a user is presented sequentially each text and non-text element and one or more user interface controls for adjusting one or more aspects of the particular element in the image or part of the image. For example, the user may adjust, remove or add a boundary or area for either a text or design element. A design element may be changed to a text element and vice versa. A word that had been identified as two words or two text elements may be combined into one; two words may be combined into a single text element. A boundary may be enlarged in a particular portion of the image.

Another exemplary scenario of identification and correction is as follows—for correction of individual characters. An image is captured or sent to a device. The image is processed by identifying one or more regions that likely contain text. Then design elements and text elements are identified in the regions likely to contain text. Word and character boundaries are established. Then, if any elements have some level of unrecognizability or level of uncertainty in identification, these regions are presented to a user through a user interface. A user then visually assesses, for example, mis-identified letter such as a letter "a" in the word "mare" when it should have been identified as "more." A user is given an option to replace individual copies of stylized words with another correct copy of the same or similar stylized word (for example, from the same image and collection of text). Alternatively, a user is given an option to replace individual copies of one or more individual characters with another correct copy of the same or similar stylized word. Thus, in the above example, a user could select another stylized version of the word "more" or another stylized version of the letter "o" to replace or correct the word "mare" using another copy of the word or letter found in the same text region of the same electronic image containing text. Upon completion of any corrections, a relevant portion of the electronic image of text is presented for use and viewing on a particular device.

Figure 8:
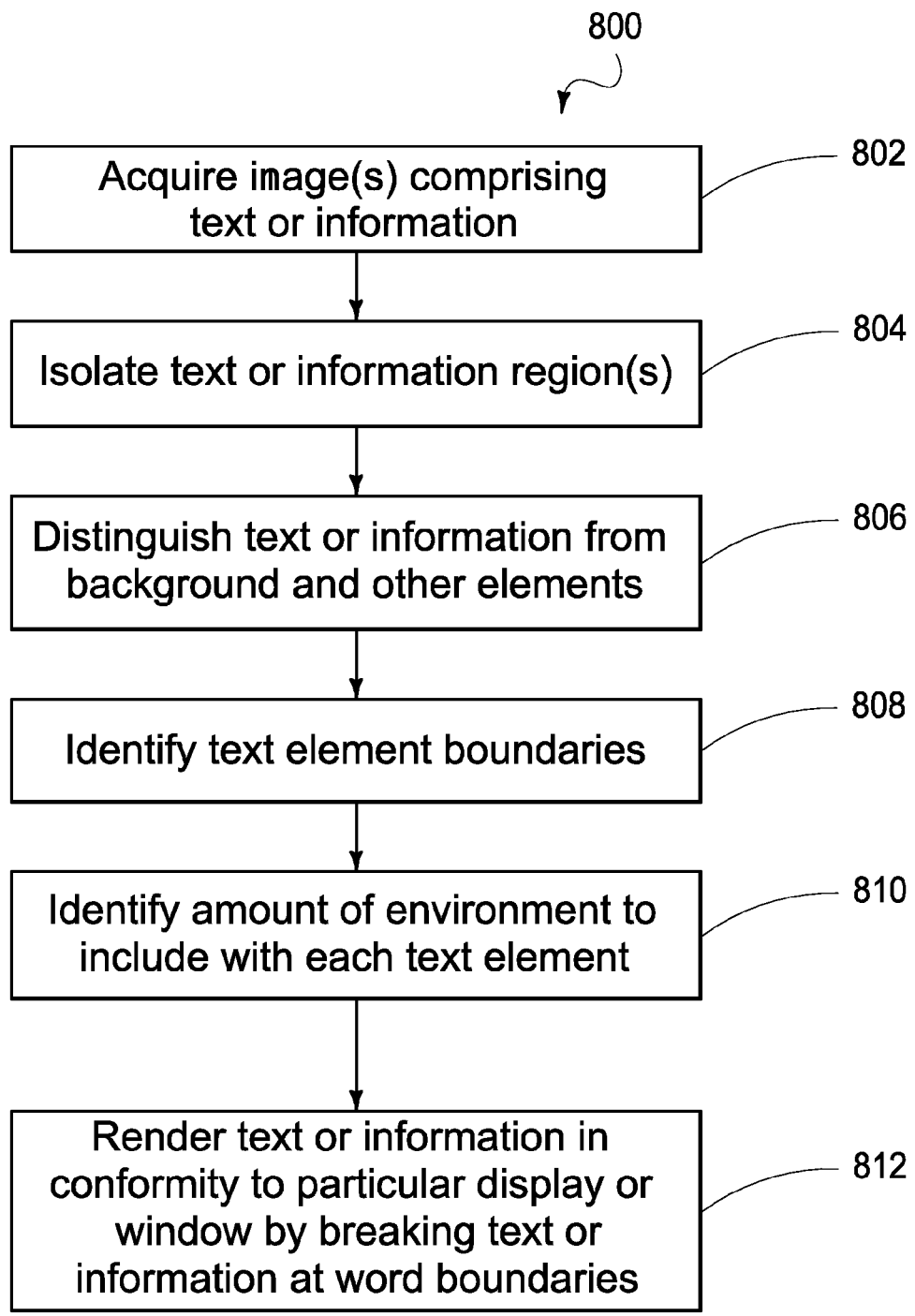
FIG. 8 shows an exemplary implementation of a method to treat text captured in an electronic image.

FIG. 8 shows an exemplary implementation of a method 800 to treat text or one or more text-containing regions identified in an electronic image. With reference to FIG. 8, a method 800 comprises acquiring or accessing one or more images comprising text or information (step 802). Next, one or more text or information regions are identified (step 804). The information regions are regions in the electronic image that are identified as likely to contain text. Subsequently, text or information in each of these regions is distinguished from respective background(s), noise and other non-text elements, features, shadings, et cetera (step 806). At this point, each text element (word, character, et cetera) may be made associated with one or more layers (conceptual or actual such as in a software construct). Next, word boundaries are identified (step 808). Word boundaries allow for breaking contiguous words or representations of words to be wrapped to one more subsequent lines. Next, and optionally, an amount of background or an amount of image around each text element (e.g., word, character) is determined for inclusion with each text element (step 810). This step 810 may include smoothing, averaging, modifying, removing or adding a gradient or other manipulation as needed or desired and may be dependent on one or more factors such as a characteristic of a device, an environmental condition, a setting selected by a user, et cetera. In a subsequent step, text or information is rendered on a device, display, screen or surface (such as by projection) in conformity to the particular display. Depending on a size (e.g. width), text or information is broken as needed at word boundaries (step 812). This step 812 may include transforming each word or one or more boundaries or background associated with each text element (e.g., word, character) along one or more edges of each text element depending on the size or depending one or more other properties of a screen or device. Some or all of these steps may be performed in any order depending on the circumstances or conditions.

Other Considerations

The invention may be used on a collection of images. For example, a batch or collection of images or photographs of parts or all of a text region may be combined. One or more programs, processes or algorithms operate to create a single best version of the text region—a version that attempts to represent the text region most accurately as it appears to a human viewer. The single best version may be comprised of one or more final images or may comprise parts of the original or source images. After being combined, the best version of the text region is then treated as described above. Applied to the exemplary text region in FIG. 2, several (high or low resolution) photographs of the menu 202 are taken and combined. The output would be the same as that shown in FIG. 6, but the process would perhaps have multiple copies of the various regions of the menu 202 to draw from when creating the output shown in FIG. 6. In another example, various photos of a book could be combined into a single work or pieces of a single work. Each page may be so combined. The single work would comprise the best parts or rendition or copy of each page. The single work would be a copy of the work with a high level of fidelity to the look and feel of the original and would include an ability to adapt to any display as described herein. Thus, text or other information of a book or other work would appear substantially more like the original than previously possible, more like the artist, author and/or publisher intended the work to appear—but only in a digital form.

A final single work could be generated from a collection of very high resolution images or could be created or generated from a collection of low resolution images, or even from a collection of images taken at different times, different dates, different angles, different lighting conditions and at different resolutions such as from different cameras or devices. Within such a collection, a text such as a menu item text 210 would be identified as a reference text. Sizing of elements and text would be based from one or more such reference texts.

In an alternative implementation, from one or more images, the method further comprises identification and analysis of a text and yielding one or more fonts from the one or more images. For example, with reference to FIG. 2, analysis of the menu item text 210 could yield a Giovanni Ristorante menu item font or a title font. First, words would be identified. Then individual letters would be identified. Then, when text is subsequently rendered on a device (and broken at a word boundary), each letter could be rendered from a generated font—a collection of letters that were identified as the best specimens of the letters in the text region(s) in the image(s) of the menu 202. Alternatively, the collection of letters could be generated, letter by letter, from an average or smoothing of individual identified letters, characters and other marks. Thus, the look and feel of the original menu 202 could be rendered on any device. Further, new works could be generated from the aesthetics captured in the menu 202. Further, previous works could be re-rendered in a format based on the aesthetics captured in the menu 202.

In another alternative implementation, the method further comprises translating each text or information into a second language. For example, a translation could be made on a word by word basis or on a meaning (e.g., semantic, rules based, grammatical conversion) basis or some other basis. The translation would be from a first or original language into another language. The words, text or information would appear in the stylized format as the original, but, when displayed on a device such as a smart phone, the translated words would be broken at a word boundary. Thus, using the menu 202 of FIG. 2 as an example, the original look and feel of the menu 202 would be similar, but each word, phrase, menu item (e.g., Desserts, "double chocolate cake") would be translated into a second language. Thus, rendering text or information on a new device could be a magic looking glass through which to view the world in a language of choice while maintaining as much as possible the aesthetics of the original text and information.

In a further implementation, the invention may use exchangeable image file format (EXIF) information and/or other metadata information. Such including at least the following: date and time information, camera settings, geolocation, descriptions, technical information, a thumbnail image, and angle or relative camera position (or orientation) of each image.

Photocopier

Figure 9:
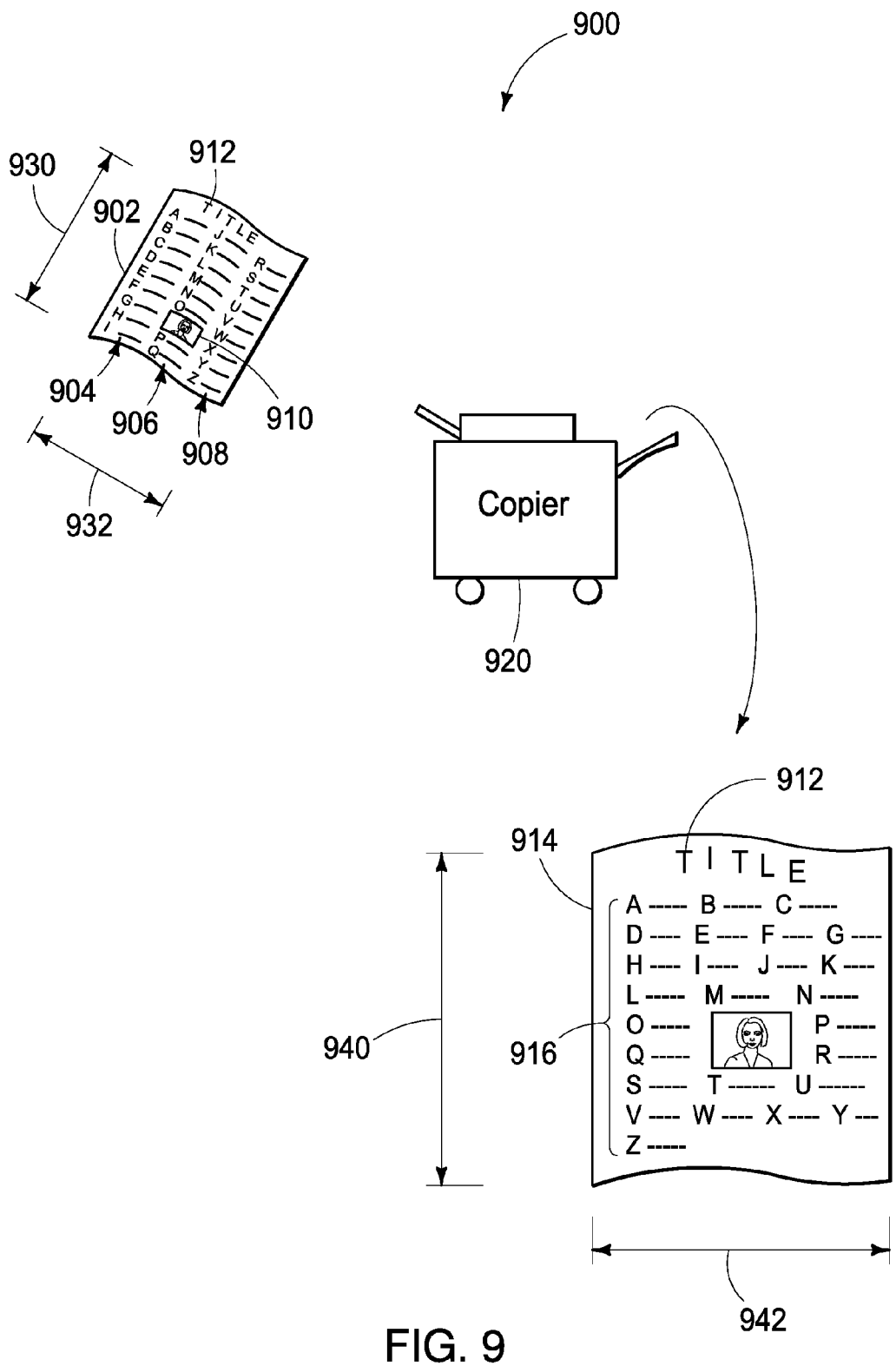
FIG. 9 shows another exemplary implementation of image reflow at word boundaries in the scenario of a photocopier.

FIG. 9 shows another exemplary implementation (900) of image reflow at word boundaries in the scenario of a photocopier. With reference to FIG. 9, a user (not shown) desires a verbatim or accurately reproduced copy of a newspaper page 902, but does not care to read it in a multi-column format or at a resolution as printed on the newspaper page 902. In this scenario, the newspaper page 902 includes text in a first column 904, text in a second column 906 and text in a third column 908. The newspaper page also includes a picture 910 (e.g. a bust of a person) and a title text 912. A user takes the newspaper page 902, places on a photocopier 920 (actual, electronic, software or conceptually) and, instead of selecting a control to initiate an ordinary copy, selects a control to initiate image reflow at word boundaries.

The photocopier 920 is equipped with programming so as to intelligently reflow images of the text elements onto a new medium 914 such as a page of paper. During processing, one or more images of newspaper page 902 are captured. Text and non-text elements are identified. The photocopier 920 recognizes the dimensions and other characteristics of the new medium 914 and is therefore free to take text elements from the first, second and third columns 904, 906, 908 and place them across the entire width 942, line for line, using the entire width of the new medium 914 as shown in FIG. 9. Text is wrapped onto a new line as needed at a text element boundary (e.g., word or character boundary). Images or representations of each of the words from the newspaper page 902 are printed or transferred to the new medium 914. The title text 912 is recognized as a header-type text and is placed at the top of the new medium 914. The picture 910 is placed in sequence as if the user were reading down the second column 906. Text elements are reflowed around the picture 910. Instead of performing a simple copy function, the photocopier 920 has made a new version of the newspaper page 902 (on the new medium 914) but with the same fidelity as would be captured with a traditional photocopier because each of the text elements (words) have been faithfully copied to the new medium 914 as they appeared in the original newspaper page 902. The user may have chosen an option to reduce or enlarge the original. However, the output would at least be of the same quality as the original.

Optionally, the copier 920 may be programmed with smoothing and other functions so as to improve or enhance the output of the text from the newspaper page 902. Such smoothing would be evident especially in a case where the user enlarges text from a traditional newspaper page because such text is traditionally pixelated as viewed with the naked eye: enlargement would exacerbate this condition.

With reference to FIG. 9, the newspaper page 902 has a vertical dimension 930 and a horizontal dimension 932. A traditional photocopier may have been programmed sufficiently to resize the source (newspaper page 902) to accommodate these dimensions 930, 932 by reducing an output image of the newspaper page to fit on a new medium with corresponding dimensions 940, 942. However, such traditional photocopier would just scale down the entire original medium uniformly to do so. A source text may become unreadable through such process. In contrast, through the use of image reflow at word boundaries, any size of input medium may be accommodated and transferred onto any size of output medium acceptable to the photocopier 920. For example, even though the input dimensions 930, 932 may not be a standard size, the output is unaffected. The photocopier 920 uses as many pages of the new medium 914 as needed. Thus, the source text is reflowed onto an output or new medium that has an arbitrary new medium height 940 and an arbitrary new medium width 942. Further, a single source page may end up on multiple output pages or new medium pages, or multiple source pages may end up on a single new medium page, depending on the wishes of the user of the photocopier 920 and the setting desired or selected. A result is faithfully reproduced text.

First in, First Out Devices

Figure 10:
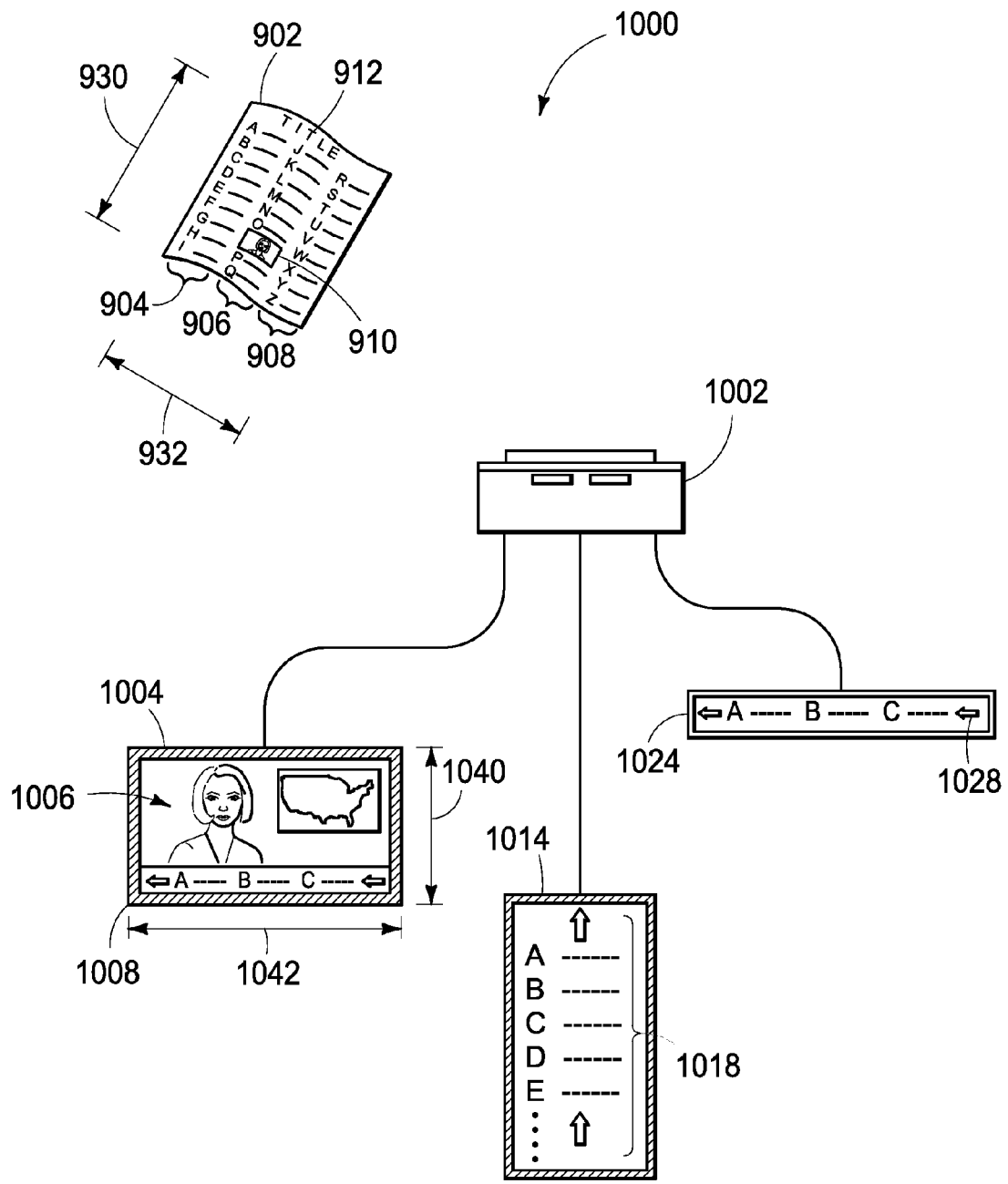
FIG. 10 shows yet another exemplary implementation of image reflow at word boundaries in the scenario of a teleprompter or other first in, first out device.

FIG. 10 shows another exemplary implementation (1000) of image reflow at word boundaries in the scenario of a teleprompter; closed captioning; subtitles; or other first in, first out device or system. With reference to FIG. 10, a user (not shown) desires a verbatim or accurately reproduced stream of information taken from a multi-column formatted document such as a printed newspaper page 902. In this scenario, the newspaper page 902 includes stylized text in a first column 904, stylized text in a second column 906 and stylized text in a third column 908. The newspaper page also includes a picture 910 (e.g. a bust of a person) and a title text 912. A user takes the newspaper page 902, passes it to, by, into or through a scanning device 1002 (actual, electronic, software or conceptually) and, instead of selecting a control to initiate an ordinary copy, selects a control to initiate image reflow at word boundaries.

The scanning device 1002 is equipped with programming so as to intelligently reflow images of the text elements onto another (output or receiving) device such as a television 1004, a vertically mounted display 1014 and an electronic billboard 1024. With reference to FIG. 10, a television 1004 may display reflowed text 1008 during a news program 1006. A vertically mounted display 1014 may display reflowed text 1018 in a doctor's office or at an airport. An electronic billboard 1024 may display reflowed text 1028 at a sporting event, on a trading floor or in a classroom.

During processing, one or more images of the newspaper page 902 are captured. Text and non-text elements are identified. The scanning device 1002 formats an output according to the dimensions and other characteristics of another device 1004, 1014 and 1024 and is therefore free to take text elements from the first, second and third columns 904, 906, 908 and place them onto the output device 1004, 1014 and 1024 as shown in FIG. 10. Text is wrapped onto a new line as needed at a text element boundary (e.g., word or character boundary). Images or representations of each of the words from the newspaper page 902 are shown on any output device 1004, 1014 and 1024. The title text 912 is recognized as a header-type text and may be shown before any of the body of the newspaper text. The picture 910 is placed in sequence as if the user were reading down the second column 906 of the newspaper page 909. Instead of performing a simple copy function, the scanning device 1002 has made a new version of the newspaper page 902 (on the output devices 1004, 1014 and 1024) but with the same fidelity as would be captured with a traditional scanning or imaging device 1002 because each of the text elements (words) have been faithfully reproduced on the output devices 1004, 1014 and 1024 as they appeared on the original newspaper page 902. An output would at least be of the same quality as the original newspaper page 902.

Optionally, the scanning or imaging device 1002 may be programmed with smoothing and other functions so as to improve or enhance the output of the text from the newspaper page 902. Such smoothing would be evident especially in a case where the user enlarges text from a traditional newspaper page because such text is traditionally pixelated as viewed with the naked eye: enlargement would exacerbate this condition.

With reference to FIG. 10, the newspaper page 902 has a vertical dimension 930 and a horizontal dimension 932. Through the use of image reflow at word boundaries, any size of input medium may be accommodated and transferred onto any size of output device or system such as those output devices 1004, 1014 and 1024 shown. For example, even though the input dimensions 930, 932 may not be a standard size, the output is unaffected. The scanning device 1002 scrolls or feeds the content of the newspaper page 902 onto an output device. The content 1008, 1018 and 1028 moves on the respective devices as shown. Line breaks are formed in the text at a word boundary as needed. Thus, the source text is reflowed onto an output or output device (or frame or window) that has an arbitrary new medium height 1040 and an arbitrary new medium width 1042. In a preferred implementation, the source text is scrolled onto, across and off of the output devices 1004, 1014 and 1024 at any size. A result is faithfully reproduced text shown at an arbitrary size on one or more lines of an output device 1004, 1014 and 1024 such as those shown in FIG. 10.

Exemplary Device

Figure 11:
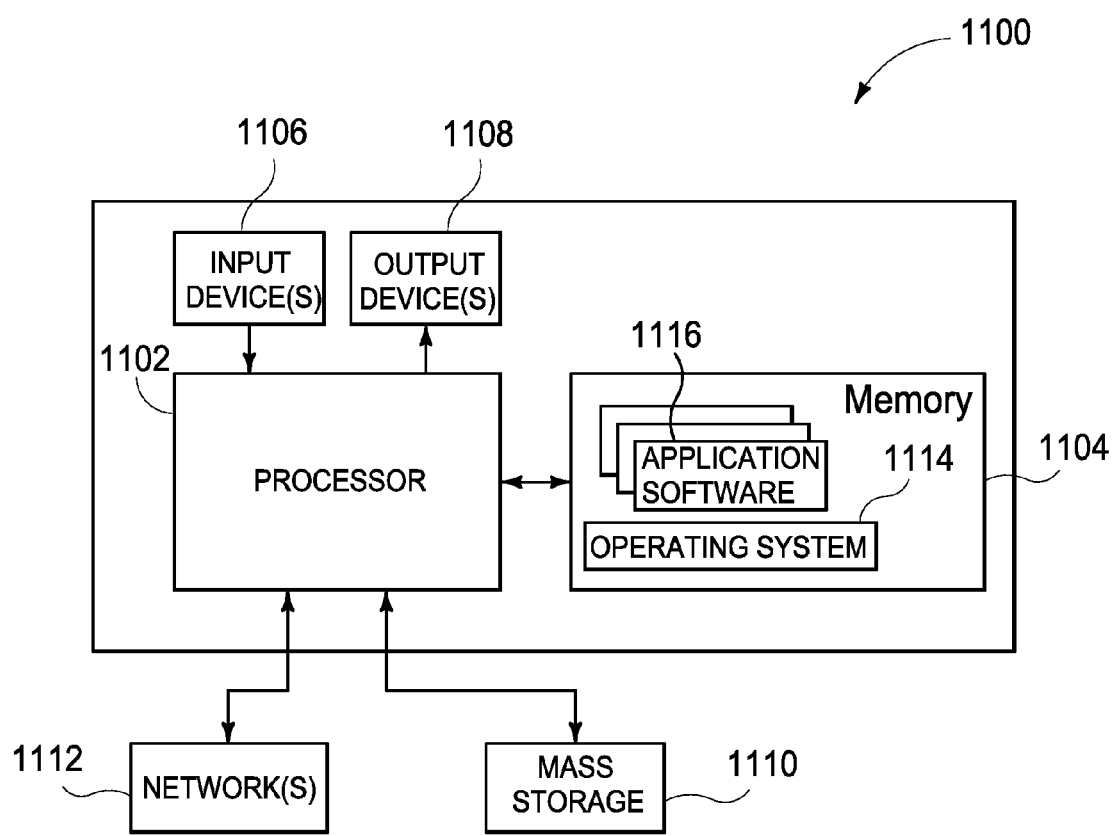
FIG. 11 shows an exemplary computer system or hardware and/or software with which the present invention may be implemented.

FIG. 11 of the drawings shows an exemplary hardware 1100 or device that may be used to implement the present invention. Referring to FIG. 11, the hardware 1100 typically includes at least one processor 1102 coupled to a memory 1104. The processor 1102 may represent one or more processors (e.g. microprocessors), and the memory 1104 may represent random access memory (RAM) devices comprising a main storage of the hardware 1100, as well as any supplemental levels of memory, e.g., cache memories, non-volatile or back-up memories (e.g. programmable or flash memories), read-only memories, etc. In addition, the memory 1104 may be considered to include memory storage physically located elsewhere in the hardware 1100, e.g. any cache memory in the processor 1102 as well as any storage capacity used as a virtual memory, e.g., as stored on a mass storage device 1110.

The hardware 1100 also typically receives a number of inputs and outputs for communicating information externally. For interface with a user or operator, the hardware 1100 may include one or more user input devices 1106 (e.g., a keyboard, a mouse, imaging device, scanner) and a one or more output devices 1108 (e.g., a Liquid Crystal Display (LCD) panel, a sound playback device (speaker)).

For additional storage, the hardware 1100 may also include one or more mass storage devices 1110, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 1100 may include an interface with one or more networks 1112 (e.g., a local area network (LAN), a wide area network (WAN), a wireless network, a cellular network (not shown) and/or the Internet among others including all of the devices or equipment necessary to carry out network communication) to permit the communication of information with other computers or devices coupled to the networks. It should be appreciated that the hardware 1100 typically includes suitable analog and/or digital interfaces between the processor 1102 and each of the components 1104, 1106, 1108, and 1112 as is well known in the art.

The hardware 1100 operates under the control of an operating system 1114, and executes various computer software applications, components, programs, objects, modules, etc., to implement the techniques described above. In particular, the computer software applications may include a client application, in the case of the client user device or smart phone 302. Moreover, various applications, components, programs, objects, etc., collectively indicated by reference 1116 in FIG. 11, may also execute on one or more processors in another computer coupled to the hardware 1100 via a network 1112, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as "computer programs." The computer programs typically comprise one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

Systems, devices and methods have been described for facilitating the display or use of displaying or using text and other information in a format that substantially appears as originally displayed or found on or in a medium (e.g., screen, television, paper, book, newspaper, fax, sign, photograph, magazine, etching, sculpture). Throughout, for sake of simplicity in explanation, reference is made to text and/or words. However, text and words refer generally to any information that is capable of being perceived, identified, recognized or used and may be found in or on any medium. While a smart phone is referred to herein, it is merely exemplary. It is to be understood that "smart phone" refers to any device that cannot display an actual sized representation of the menu 202 or to a device with a relatively small display (e.g., tablet, laptop, appliance).

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

While the invention has been described with respect to a preferred implementation, other implementations are possible. The concepts disclosed herein apply equally to other non-described systems, devices and methods for displaying or using text (and information generally) in a format that substantially appears as originally displayed or found on or in a medium. Furthermore, the concepts applied herein apply more generally to displaying or using text and breaking adjacent text at word and other logical boundaries such as at, near or around a character or element. The invention is described below with reference to the accompanying figures.

The foregoing discussion has been presented for purposes of illustration and description. Various features from one implementation can be combined with other features from other implementations. The description is not intended to limit the invention to the form or forms disclosed herein. Consequently, variation and modification commensurate with the above teachings, within the skill and knowledge of the relevant art, are within the scope of the present invention. The implementations described herein and above are further intended to explain the best mode presently known of practicing the invention and to enable others skilled in the art to use the invention as such, or in other implementations, and with the various modifications required by their particular application or uses of the invention. It is intended that the appended claims be construed to include alternate implementations to the extent permitted.

The invention claimed is:

1. A method for preserving an original appearance of stylized information and breaking the stylized information at an element boundary, the method comprising:
   acquiring an image including stylized information, wherein the stylized information includes a plurality of elements, and the plurality of elements includes one or more words that are arranged in an arced line;
   distinguishing each of the elements of stylized information in the image from one another;
   identifying at least one element boundary for each of the elements of stylized information, wherein an element boundary indicates a division between successive elements of the stylized information;
   displaying a representation of each of the elements of stylized information in the image on a display by placing the elements of stylized information, one element after another element, by breaking the stylized information at an element boundary; and
   rotating a first word in the arced line relative to a second word in the arced line to display the first word and the second word in one or more non-arced lines,
   wherein:
      the displayed elements comprise bordering elements,
      the bordering elements are elements sharing a boundary, and
      the displaying comprises smoothing representations of boundaries between bordering elements.

2. The method of claim 1, wherein the stylized information is text, and wherein the elements are text elements.

3. The method of claim 1, wherein any element boundary is a word boundary.

4. The method of claim 1, wherein the elements are characters, and wherein any element boundary is a character boundary.

5. The method of claim 1, wherein the method further comprises:
   prior to displaying the stylized information from the image on the display, identifying a non-informational element in the image; and
   displaying the non-informational element with the stylized information in about a same relative position as compared with the non-informational element in the original image relative to at least one of the plurality of elements of stylized information.

6. The method of claim 5, wherein a size of the non-informational element is scaled according to an aspect of a display device.

7. The method of claim 1, wherein a size of at least one of the elements of the stylized information is scaled according to an aspect of a display device.

8. The method of claim 1, wherein the displaying includes adjusting an aspect of a background of a first element of the stylized information relative to an aspect of a background of a second element of the stylized information.

9. The method of claim 8, wherein the aspect of the background of the first element is selected from color, hue, brightness, shading, intensity and contrast.

10. The method of claim 1, wherein the displaying includes adjusting an aspect of a background of each of the elements of stylized information on the first line relative to an aspect of a background of at least one other of the elements of stylized information on the first line.

11. The method of claim 1, wherein the method further comprises:

combining elements from two or more images, each including stylized information; and creating a single set of elements of stylized information such that there are no duplicate elements of the stylized information.

12. The method of claim 11, wherein the combining elements from two or more images includes averaging an aspect of a representation of an element that is found in two or more images.

13. One or more non-transitory computer readable media encoded with instructions for performing a method, the method comprising:

identifying a region in an image containing text (a text region);

identifying an element boundary for each pair of elements in the text region, the text region including one or more elements including one or more words that are arranged in an arced line;

electronically displaying elements from the image by way of a device by wrapping successive elements onto one or more successive lines at a respective element boundary to accommodate the device; and rotating a first word in the arced line relative to a second word in the arced line to electronically display the first word and the second word in one or more non-arced lines, wherein:

the displayed elements comprise bordering elements, the bordering elements are elements sharing a boundary, and the displaying comprises smoothing representations of boundaries between bordering elements.

14. The one or more non-transitory computer readable media of claim 13, wherein the text has a stylistic appearance, and wherein the element boundary is a natural language boundary.

15. A system for transforming text in an image for display on a device, the system comprising:

a text parser that identifies elements within the text in the image, the elements including one or more words that are arranged in an arced line;

a boundary generator configured to associate a boundary with each element identified by the text parser;

a text renderer that reflows elements of the text onto one or more successive lines and that rotates a first word in the arced line relative to a second word in the arced line according to an aspect of the device and generates an output that includes the identified elements of the text as appearing in the image; and the device configured to receive the output from the text renderer and configured to display the elements of the text in the image on one or more successive lines and to display the first word and the second word in one or more non-arced lines, according to the aspect of the device, wherein:

the reflowed elements comprise bordering elements, the bordering elements are elements sharing a boundary, and the text renderer smoothes representations of boundaries between bordering elements.

16. The system of claim 15, wherein the image is a composite of multiple images.

17. The system of claim 15, wherein the elements of the text are scaled in size according to an aspect of the device.

18. The system of claim 15, wherein the text renderer is configured to respond to an indication of change of scale for the elements of the text.

19. The system of claim 15, wherein the text renderer modifies an aspect of a first element relative to a second element according to the aspect of the device.

* * * * *